(12) United States Patent
Lin

(10) Patent No.: US 6,765,359 B2
(45) Date of Patent: Jul. 20, 2004

(54) CONTROLLING DEVICE FOR AC/DC DRIVEN MOTOR

(75) Inventor: Pi Hsia Lin, No. 7, Alley 1, Lane 21, Minsheng 8th St., Gueiren Shiang, Tainan (TW), 711

(73) Assignees: Prolific Technology Inc., Taipei (TW); Pi Hsia Lin, Tainan (TW)

( * ) Notice: Subject to any disclaimer, the term of this patent is extended or adjusted under 35 U.S.C. 154(b) by 0 days.

(21) Appl. No.: 10/272,676

(22) Filed: Oct. 17, 2002

(65) Prior Publication Data

US 2003/0071592 A1 Apr. 17, 2003

(30) Foreign Application Priority Data

Oct. 17, 2001 (TW) .......................................... 90125720 A

(51) Int. Cl.⁷ .............................. H02P 1/24; H02P 5/06; H02K 23/64
(52) U.S. Cl. ........................ 318/442; 318/441; 318/107; 318/245
(58) Field of Search ................................ 318/442, 441, 318/107, 245, 272

(56) References Cited

U.S. PATENT DOCUMENTS

| | | | |
|---|---|---|---|
| 4,039,913 A | * | 8/1977 | Clegg .......................... 318/245 |
| 5,250,881 A | * | 10/1993 | Yoshino ...................... 318/254 |
| 5,270,631 A | * | 12/1993 | Takahashi et al. ............ 318/135 |
| 5,945,795 A | * | 8/1999 | Lee .............................. 318/254 |
| 6,016,041 A | * | 1/2000 | Weinmann .................... 318/245 |
| 6,239,565 B1 | * | 5/2001 | Alvaro et al. ................ 318/254 |
| 6,577,031 B2 | * | 6/2003 | Morooka et al. .......... 310/68 R |
| 2003/0052629 A1 | * | 3/2003 | Hsieh .......................... 318/254 |

FOREIGN PATENT DOCUMENTS

| | | |
|---|---|---|
| TW | 159486 | 6/1991 |
| TW | 184601 | 5/1992 |
| TW | 204795 | 4/1993 |
| TW | 306643 | 5/1997 |
| TW | 450479 | 8/2001 |
| TW | 456673 | 9/2001 |

* cited by examiner

Primary Examiner—Robert Nappi
Assistant Examiner—Edgardo San Martin
(74) Attorney, Agent, or Firm—Thomas, Kayden, Horstemeyer & Risley

(57) ABSTRACT

A motor controlling device for an AC/DC driven motor is used for an AC and DC motor. The motor controlling device comprises an AC/DC converting unit, a voltage stabilizing unit, a phase detecting/controlling unit, and a high voltage driving unit. The AC/DC converting unit receives an AC power source to convert the AC power source into a high voltage DC voltage. The voltage stabilizing unit receives the high voltage DC voltage to convert it into a low voltage DC voltage. The phase detecting/controlling unit detects a polarity of the permanent magnet to output a first detecting and a second detecting signals accordingly, so as to provide automatically a shut down protection when the motor is locked. The high voltage driving unit receives the first detecting and the second detecting signals to drive the motor accordingly.

12 Claims, 2 Drawing Sheets

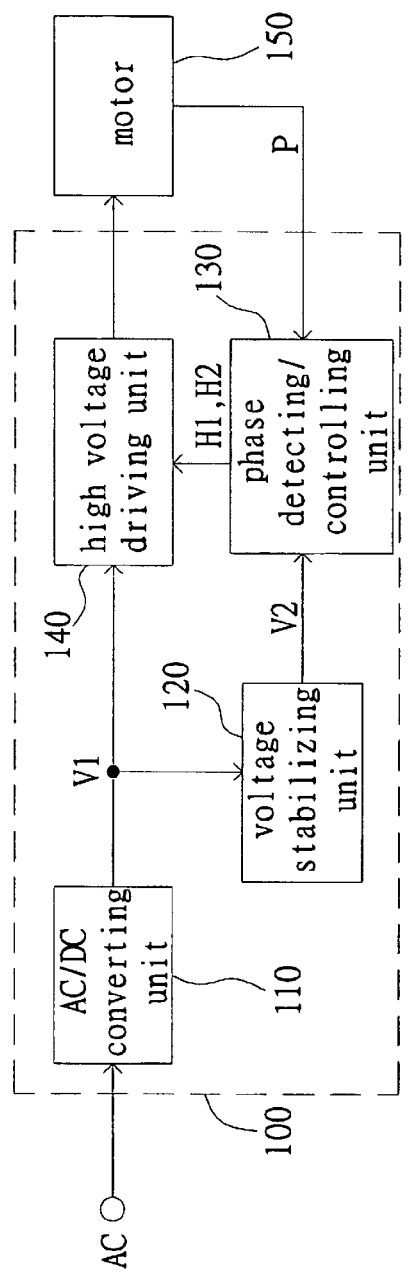
FIG. 1
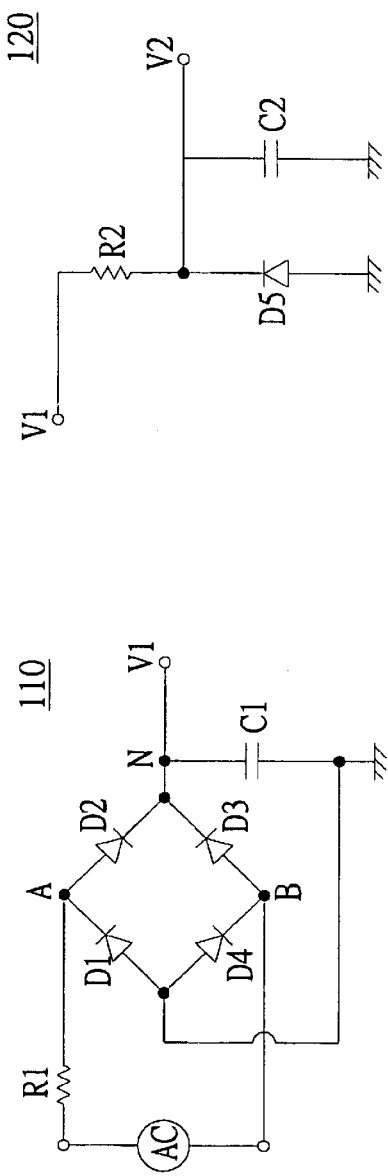
FIG. 2
FIG. 3

CONTROLLING DEVICE FOR AC/DC DRIVEN MOTOR

This application incorporates by reference Taiwan application Serial No. 090125720, filed Oct. 17, 2001.

BACKGROUND OF THE INVENTION

1. Field of the Invention

This invention relates in general to a controlling device for a motor. More particularly, the invention relates to a controlling device for a motor capable of being driven by an AC power source or a DC power source.

2. Description of Related Art

A conventional AC (alternative current) fan uses an AC power source as its working power source, so that the coil wiring of the stator or the rotor is to form an induced magnetic field to operate the motor. However, since the rotational speed of the motor is proportional to the frequency of the AC power source, the rotational speed of the motor cannot be increased due to too low frequency of the AC power source. For some situations requiring a high wind flow, the motor cannot increase its rotational speed because the conventional fan's motor uses the AC power source. The formula of fan speed expressed as follow: r.p.m.=(N*f/2)*(60 sec.), wherein r.p.m. is the round-per-minute speed, N is the pole of wirings, and f is the frequency of AC power source.

Conventionally, in order to obtain a high wind flow by using the AC motor, multiple motor sets are combined to achieve an output of high wind flow. An alternative method is to increase the number of pole wirings within the AC motor, so that the motor's rotational speed is increased to arise the wind flow. However, to increase the number of pole wirings is not only that the coil wirings are very difficult, but the motor's manufacturing cost is also increased. Therefore, these solutions do not meet the economic requirements.

In addition to the above defects, the inductance of coil is always in an high impedance if the fan working in AC mode, which is because the current of coil is alternatively changed. The working current of the AC motor can be expressed as followed.

$$I=V/Z \quad (1)$$

Where I is the working current of the AC motor, V is the voltage provided by the power source, and Z is the impedance of the coil. From the formula (1), the impedance Z of the coil is expressed below.

$$Z=\sqrt{R^2+XL^2} \quad (2)$$

where XL is an AC inductance, $XL=2\pi f L$. Therefore, when the motor coil is from the static status to the operation status, it needs a sufficient current to make the coil to create a sufficient starting torque. In addition, the current is proportional to the voltage, and therefore, the starting voltage for the motor is also very high. Accordingly, the low voltage characteristic of the AC motor is very worse. Moreover, when the conventional AC motor is locked, because no break protection device, the temperature increases will damage the fan.

As a result, for the current fan using the AC motor, its rotational speed, starting up approach, protection device and manufacturing cost are restricted by the AC power source, and therefore cannot overcome the aforementioned defects. Therefore, to further improve the AC motor structure is demanded.

SUMMARY OF THE INVENTION

In light of the foregoing description, it is an object of the present invention is to provide a motor controlling device, wherein an AC power source is used and the rotational speed of the motor of the fan can be effectively increased.

According to the object(s) mentioned above, the present invention provides a motor controlling device for an AC/DC driven motor. This controlling device is used for an AC/DC driven motor. The motor comprises plural coils, and the motor controlling device comprises an AC/DC converting unit, a voltage stabilizing unit, a phase detecting/controlling unit, and a high voltage driving unit. The AC/DC converting unit is inputted an AC power source to convert the AC power source into a high voltage DC voltage. The voltage stabilizing unit is coupled to the AC/DC converting unit, for receiving the high voltage DC voltage to convert it into a low voltage DC voltage. The phase detecting/controlling unit is coupled to the motor and the voltage stabilizing unit, for receiving the low voltage DC voltage as a work voltage, and for detecting a polarity of the permanent magnet to output a first detecting and a second detecting signals accordingly, so as to provide a shut down protection when the motor is locked. The high voltage driving unit is coupled to the AC/DC converting unit, the phase detecting/controlling unit, and the motor, for receiving the high voltage DC voltage as a work voltage, and for receiving the first detecting and the second detecting signals to output accordingly a first driving and a second driving signals so as to drive the motor.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

FIG. 1 is a block diagram of a controlling device for an AC/DC motor according to one preferred embodiment of the present invention;

FIG. 2 is an exemplary circuit diagram for the AC/DC converting unit;

FIG. 3 is an exemplary circuit diagram for the voltage stabilizing unit;

DESCRIPTION OF THE PREFERRED EMBODIMENT

Figure 5:
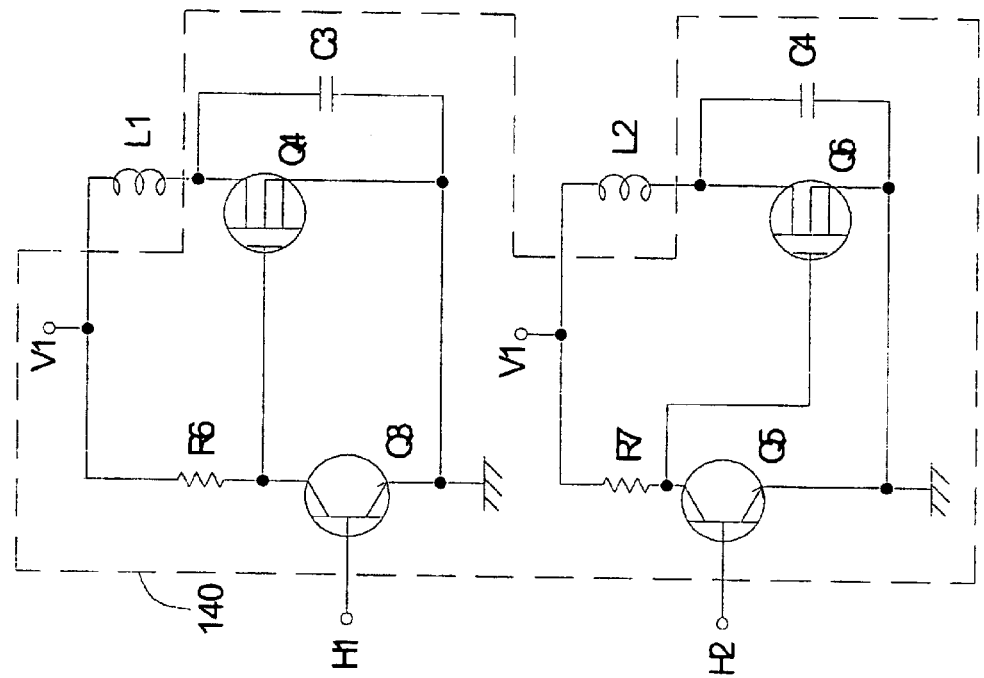
FIG. 5 is an exemplary circuit diagram for the high voltage driving unit.

FIG. 1 is a block diagram of a controlling device for an AC/DC motor according to one preferred embodiment of the present invention. The AC/DC motor controlling device 100 is supplied an AC power source to drive a motor 150 accordingly. The motor includes permanent magnets, a coil L1 and a coil L2. The AC/DC motor controlling device 100 includes an AC/DC converting unit 110, a voltage stabilizing unit 120, a phase detecting/controlling unit 130 and a high voltage driving unit 140. The AC/DC converting unit 110 is supplied the AC power source for converting the AC power source into a high DC voltage V1. The voltage stabilizing unit 120 is coupled to the AC/DC converting unit 110 and receives the high voltage DC voltage V1 to convert the high voltage DC voltage V1 into a low DC voltage V2. The phase detecting/controlling unit 130 is coupled to the motor 150 and the voltage stabilizing unit 120, for receiving the low DC voltage V2 as a work voltage, and for detecting a polarity signal P from the permanent magnet of the motor 150 to output a first detecting signal H1 and a second detecting signal H2 accordingly. The high voltage driving unit 140 is coupled to the AC/DC converting unit 110, the phase detecting/controlling unit 130 and the motor 150, for receiving the high DC voltage V1 as a work voltage, and receiving the first detecting signal H1 and the second detecting signal H2 to output accordingly a driving signal so as to drive the first and the second coils L1, L2, respectively.

The AC/DC converting unit 110 can be a full wave rectifier or a half wave rectifier, for example, and in this embodiment, the full wave rectifier is used as an example. FIG. 2 is an exemplary circuit diagram for the AC/DC converting unit 110. The AC/DC converting unit 110 includes diodes D1, D2, D3, D4, a resistor R1 and a capacitor C1, whose coupling relationship is as shown in FIG. 2. Nodes A and B are respectively connected to two ends of the AC power source, and the node N outputs the high DC voltage V1. The AC power source is rectified to be converted into the high DC voltage V1.

FIG. 3 is an exemplary circuit diagram for the voltage stabilizing unit 120. The voltage stabilizing unit 120 includes a pull-down resistor R2, a zener diode D5 and a regulating capacitor C2. The pull-down resistor R2 is coupled to the AC/DC converting unit 110 for receiving the high DC voltage V1 to provide a voltage drop. The regulating capacitor C2 is coupled to another end of the pull-down resistor R2, and the zener diode D5 is connected to the regulating capacitor C2 in parallel. A voltage across the regulating capacitor C2 is the low DC voltage V2.

Figure 4:
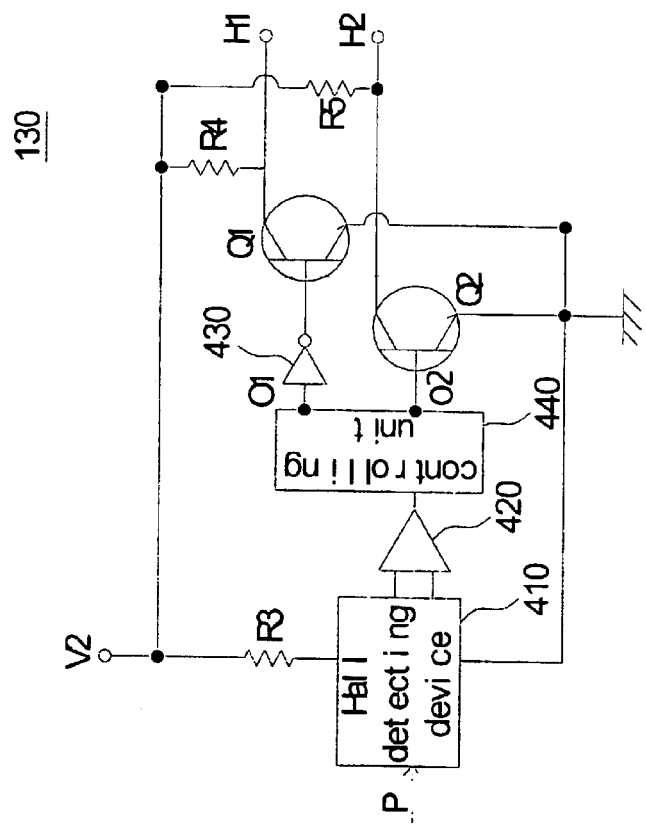
FIG. 4 is an exemplary circuit diagram for the phase detecting/controlling unit.

FIG. 4 is an exemplary circuit diagram for the phase detecting/controlling unit 130. The phase detecting/controlling unit 130 includes a resistor R3, a Hall detecting device 410, an amplifying device 420, a controlling unit 440, an inverter 430 and transistors Q1, Q2. The Hall detecting device 410 receives the polarity signal P for detecting a polarity variation of the permanent magnet of the motor 150, and then outputs a Hall signal. The amplifying device 420 is coupled to the Hall detecting device 410 to receive and amplify the Hall signal. The controlling unit 440 includes a motorlocked detection/protection circuit. When the motor 150 is locked, the controlling unit 440 outputs a pause signal to stop Q4, Q6 working, and when the motor operates normally, the controlling unit 440 outputs the amplified Hall signal. The inverter 430 and the transistors Q1, Q2 constitute a small power driving device that is coupled to the controlling unit 440, for outputting detecting signals H1, H2. When the motor is locked, the detecting signals H1, H2 are a high level, which means that the motor is in a shut down status. The controlling unit 440 further includes a motor rotational speed controlling circuit capable of receiving a external signal like as a thermistor, a voltage, a frequency, or a pulse signal, so as to adjust the motor's rotational speed.

FIG. 5 is an exemplary circuit diagram for the high voltage driving unit. The high voltage driving unit 140 comprises a first current amplifying device and a second current amplifying device, for receiving and amplifying the detecting signals H1, H2 respectively, and therefore to drive the coils L1, L2 of the motor 150, respectively. The first current amplifying device comprises a resistor R6, a transistor Q3, a high voltage transistor Q4 and a capacitor C3, and the second current amplifying device comprises a resistor R7, a transistor Q5, a high voltage transistor Q6 and a capacitor C4, wherein their coupling relationship is as shown in FIG. 5. The high voltage transistors Q4, Q6 can be a metal oxide semiconductor (MOS) transistor. The capacitors C3, C4 are used for eliminating the reverse electromotive force created during the polarity conversion of the coils L1, L2.

The previous description concerns the structural connection of the motor controlling device according to the preferred embodiment of the invention. The detail operation is further described as follows. The AC power source is converted by the AC/DC converting unit 110 to a ripple high DC voltage V1 that is further fed to the next stage, the voltage stabilizing unit 120 and the high voltage driving unit 140. The high DC voltage V1 is converted by the voltage stabilizing unit 120 into the low DC voltage V2 that serves as a working voltage of the phase detecting/controlling unit 130. When the Hall detecting device 410 of the phase detecting/controlling unit 130 detects a polarity variation of the permanent magnet of the motor 150, the output Hall signal is amplified by the amplifying device 420. The amplified Hall signal is fed to the controlling unit 440. When the motor 150 operates normally, the outputs O1, O2 of the controlling unit 440 are equal to the amplified Hall signal received by the controlling unit 440. When the motor 150 is locked, the pause signal is output to interrupt the power supply to the motor, i.e., the output O1 is at a high level and the output O2 is at a low level. Therefore, in a normal situation, the transistors Q1, Q2 are switched on, and the transistors Q3, Q5 and the high voltage transistor Q4, Q6 are turned on respectively, so that the coil L1, L2 can obtain a sufficient driving power and the motor 150 can generate a torque to rotate.

As described above, the invention uses the DC motor to replace the AC motor in the fan, and additionally, a circuit design is used so that the motor can rotate at a high rotational speed when an AC power source is supplied. Therefore, the motor's rotational speed of the present invention is not limited by the frequency of the AC power source. Furthermore, when the motor is from the static status to the operation status, the DC power source is supplied to coil as its working power source, so that the impedance of the coil has no XL component that exists when operating under the AC power source. Therefore, the motor can be activated by a low voltage. Moreover, according to the embodiment, the controlling unit can output a high level output O1 and a low level output O2 when the motor is locked. Therefore, the motor can be shut down to prevent the temperature from increasing too high. In addition, if power replaced by a DC power source the motor can be also normally operated. Namely, the motor controlling device of the present invention can be used in an AC/DC driven motor, and has flexibility in applications.

In summary, the motor controlling device of the present invention can use the AC or the DC power source to control a DC driven motor, so that the motor's rotational speed can be increased, the temperature can be prevented from increasing too high when the motor is locked and the heat dissipation effect can be also increased.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What claimed is:

1. A controlling device for an AC/DC driven motor, used for a motor comprising a permanent magnet, a first coil and a second coil, the controlling device comprising:

an AC/DC converting unit, for receiving an AC power source to convert the AC power source into a high DC voltage;

a voltage stabilizing unit, coupled to the AC/DC converting unit, for receiving the high DC voltage to convert the high DC voltage into a low DC voltage;

a phase detecting/controlling unit, coupled to the motor and the voltage stabilizing unit, for receiving the low DC voltage as a work voltage, and for detecting a poiarity of the permanent magnet to output a first detecting and a second detecting signals accordingly; and a high voltage driving unit, coupled to the AC/DC converting unit, the phase detecting/controlling unit, and the motor, for receiving the high DC voltage as a work voltage, and for receiving the first detecting and the second detecting signals to output accordingly a first driving and a second driving signal so as to drive the first and the second coils respectively:

wherein the high voltage driving unit further comprises:
a first current amplifying device for receiving and amplifying the first detecting signal to output the first driving signal to drive the first coil; and
a second current amplifying device, for receiving and amplifying the second detecting signal to output the second driving signal to drive the second coil.

2. The controlling device of claim 1, wherein the phase detecting/controlling unit further comprises:

a Hall detecting device coupled to the motor, for detecting a polarity variation of the permanent magnet, so as to output a Hall signal;

an amplifying device, coupled to the Hall detecting device, for receiving and amplifying the Hall signal, so as to output an amplified Hall signal; and a small power driving device, coupled to the amplifying device, for receiving the amplified Hall signal to output the first and the second detecting signals accordingly.

3. The controlling device of claim 2, wherein the phase detecting/controlling unit further comprises a controlling unit, disposed between the amplifying device and the small power driving device;

wherein the controlling unit comprises a motor locked detecting/protecting circuit, and wherein when the motor is normally operated, the controlling unit outputs the amplified Hall signal to the small power driving device;

wherein when the motor is locked, the controlling unit outputs a pause signal to the small power driving device to stop driving the motor.

4. The controlling device of claim 3, wherein the controlling unit outputs a first and a second values, and when the motor is normally operated, the first and the second values are the amplified Hall signal, and when the motor is locked, the first value is high and the second value is low.

5. The controlling device of claim 4, wherein when the small power driving device receives the pause signal, the first and the second detecting signals are low.

6. The controlling device of claim 3, wherein the controlling unit further comprises a motor rotational speed controlling circuit, capable of receiving external signal, which is one of a thermistor, a voltage, a frequency, and a pulse signal, for adjusting a rotational speed of the motor accordingly.

7. The controlling device of claim 2, wherein the small power driving device further comprises:

an inverter, coupled to the amplifying device, for receiving the amplified Hall signal to output an inverse signal;

a first transistor, having a base coupled to the inverter for receiving the inverse signal, and a collector for outputting the first detecting signal; and a second transistor, having a base coupled to the amplifying device, and a collector for outputting the second detecting signal.

8. The controlling device of claim 1, wherein the voltage stabilizing unit further comprises:

a voltage dropping resistor, coupled to the AC/DC converting unit, having one end to receive the high DC voltage, and another end's voltage is the low DC voltage;

a regulating capacitor, coupled to the another end of the voltage dropping resistor; and a zener diode, coupled to the another end of the voltage dropping resistor.

9. The controlling device of claim 1, wherein the AC/DC converting unit comprises a full wave rectifier.

10. The controlling device of claim 1, wherein the AC/DC converting unit comprises a half wave rectifier.

11. The controlling device of claim 1, wherein the first current amplifying device further comprises:

a third transistor, for receiving the first detecting signal; and a high voltage transistor, coupled to the third transistor and the first coil, for outputting the first driving signal.

12. The controlling device of claim 1, wherein the second current amplifying device further comprises:

a fourth transistor, for receiving the second detecting signal; and a high voltage transistor, coupled to the fourth transistor and the second coil, for outputting the second driving signal.

* * * * *